Patented Mar. 5, 1935

1,993,034

UNITED STATES PATENT OFFICE 1,993,034

SYNTHETIC RESIN AND METHOD OF PRODUCING

Irvin W. Humphrey, Wilmington, Del., assignor to Hercules Powder Company, Wilmington, Del., a corporation of Delaware No Drawing. Application September 6, 1933, Serial No. 688,360

19 Claims. (Cl. 260—123)

This invention relates to a new composition of matter and to method for its production.

Heretofore it has been known to react maleic anhydride and phellandrene for the production of a crystalline compound, such being disclosed in the British patent to Diels and Adler, No. 300,130 of 1928; and further, it has been known to produce an amorphous resinous product by reacting maleic anhydride and alpha-terpinene such being the subject matter disclosed in an application for United States patent filed by Ernest G. Peterson and Edwin R. Littmann November 18, 1930, Serial No. 496,560.

Now, in accordance with this invention I have discovered that an acidic, amorphous resinous compound, variously advantageous for use in the commercial arts, is produced by reacting maleic anhydride, or variously equivalently maleic acid, with a pinene such as alpha-pinene, beta-pinene, etc.

It is known to react alpha- or beta-pinene with an organic acid such as formic, acetic, oxalic, benzoic, etc. to form a terpene ester. The latter on saponification with alkali yields a terpene alcohol, generally borneol or iso-borneol, sometimes fenchyl alcohol and other alcohols. It might be expected that maleic anhydride would behave in a similar manner, but such is not the case. The maleic anhydride does not form a neutral product by esterification, but reacts, through its unsaturated linkage, to form by a carbon to carbon condensation with pinene an acidic product. The resulting product is probably the anhydride of a new acid of unknown structure. The reaction product of pinene and maleic anhydride on saponification does not yield borneol or other terpene alcohol. Instead it is converted into the alkali salt of the new acid, which on acidification yields the free acid. The latter can, if desired, be employed variously in the commercial arts instead of the primary anhydride addition product, which, however, is to be preferred for the various uses.

The pinenes are terpene hydrocarbons possessing no conjugated system of unsaturated double bonds. Alpha-pinene is the principal constituent of turpentine and boils at about 154–156° C. It may be obtained by fractionation of turpentine. Beta-pinene (boiling point, about 162–166° C.) occurs in French and other turpentines and may be obtained by fractionation of these materials. As equivalents for the pure hydrocarbons, terpene cuts from turpentine relatively rich in the hydrocarbons may be used. Thus, a terpene cut boiling within about the range 150–160° C. will be relatively rich in alpha-pinene. A terpene cut from turpentine boiling within about the range 160–170° C. may be relatively rich in beta-pinene, but may also contain some alpha-pinene. Such terpene cuts may contain various other terpenes and impurities, which, however, if non-reactive with maleic anhydride, will not interfere in carrying out the process of this invention, and which can be readily separated from the final product.

In proceeding for the practical adaptation of the method in accordance with this invention for the production of the various products contemplated by this invention, a pinene, such as alpha- or beta-pinene, or a terpene cut relatively rich in one of such hydrocarbons, or a mixture of the several pinenes, or a terpene cut rich in such a mixture, will be reacted with maleic anhydride or with maleic acid. The reaction may be effected in any suitable manner, but will preferably be carried out with refluxing in the presence of heat, which will facilitate and expedite the reaction. If desired, reaction may be carried out under superatmospheric pressure. In certain cases fumaric acid, which, as is well known, will be converted into maleic anhydride by heat, may be used, if desired, in place of maleic anhydride or maleic acid.

The pinene and maleic anhydride, or equivalently maleic or fumaric acid, may be reacted in widely varying proportions. An excess of maleic anhydride, or molar proportions of maleic anhydride and pinene may be employed. However, it is generally desirable to employ an excess of pinene, for example, from 110% to 300% of the quantity necessary to combine with one mol of maleic anhydride. On completion of the reaction the excess is vaporized off. When maleic or fumaric acid is used in place of maleic anhydride, it will be desirable to use somewhat more than an equivalent amount of the acid. The pinene and maleic anhydride may be mixed cold and heated together to reaction temperature, or the pinene may be slowly added to the molten maleic anhydride. However, it is preferred to add the maleic anhydride gradually to the pinene maintained at a suitable reaction temperature.

The product contemplated by this invention will be variously characterized, depending upon the particular pinene used, or upon the particular pinene cut used for its production. The product, generally speaking, will be a light colored amorphous resin, the particular characteristics of which will be dependent upon the particular pinene used and to a degree upon the particular procedure followed in carrying out the method.

Generally speaking, the product will be a soft resin of light color and high acidity, and adaptable for various uses in the commercial arts where the use of a synthetic acidic resin base is dictated or desirable. The product will be highly advantageous for use after esterification or modification, for example, as an ingredient of coating compositions, plastics and the like and such esterified or modified products will be found to have good film forming capacity and to be compatible variously with nitrocellulose, drying oils, etc., rendering them advantageous for use in lacquers and varnishes, etc.

The presence in the pinene employed of relatively small proportions of other terpenes reactive with maleic anhydride, such as dipentene, alpha terpinene, etc. will not greatly alter the properties of the product.

As illustrative of the practical adaptation of the method of this invention, a pinene, such as alpha- or beta-pinene, or a terpene cut relatively rich in one of such hydrocarbons, or a mixture of the several pinenes, or a terpene cut rich in such a mixture, will be reacted with maleic anhydride or maleic acid, preferably in the presence of heat at a temperature (say) within about the range 150–250° C. Desirably, the pinene or terpene cut containing pinene will be in excess and the product on completion of the reaction will be separated from the excess of pinene or terpene cut and any unreacted impurities by distillation, for example, by maintaining or raising the temperature and reducing the pressure. The reaction may be carried out variously at atmospheric or superatmospheric pressure and, if desired, may be carried out in the presence of a catalyst adapted to promote the reaction. In the practical adaptation of the method in accordance with this invention any suitable form of apparatus may be used. As more specifically illustrative of the practical adaptation of the method in accordance with this invention, for example, 60 parts of alpha-pinene (b. p. 153–157° C.), 20 grams maleic anhydride and 0.2 gram paratoluene sulphonic acid are refluxed at a temperature of about 160–170° C. in any suitable form of apparatus for about 8 hours, and excess of unreacted pinene distilled off under reduced pressure. The product obtained, amounting to about 39 parts, will comprise a soft resin. The product, if desired, may be separated into relatively volatile and non-volatile portions by heating under reduced pressure, say about 5 mm. mercury, up to a bath temperature of (say) about 275–300° C. Either the volatile or non-volatile portion may be esterified and used with or without other modification in coating compositions as varnishes, lacquers and the like.

In the above example the product comprises a reaction product of the alpha-pinene and maleic anhydride. In the procedure outlined the para-toluene sulphonic acid acts as a catalyst.

As further illustrative, for example, 400 parts of alpha-pinene and 100 parts of maleic anhydride are heated in an autoclave at a temperature of about 170–175° C. under a pressure of about 5–10 pounds, for a period of three hours. On distillation off of the excess pinene, which may be effected by maintenance of the reaction temperature, or of a higher temperature, and reduction of the pressure, about 122 parts of a soft-viscous, acidic yellow resin will be obtained. An increased yield may be obtained by the use of a higher temperature and pressure, as for example, a temperature of about 180–185° C. and a pressure of about 25 pounds will, after a period of about 3 hours, yield about 165 parts of a soft resin on distillation off of excess pinene. At higher temperatures and pressures the reaction time may be reduced to as little as one-half hour with increased yield.

As illustrative of the practical adaptation of the method in accordance with this invention with the use of beta-pinene, for example, 45 parts of beta-pinene (b. p. 160–168° C.) and 25 parts of maleic anhydride are heated under atmospheric pressure for a period of about 5 hours at a temperature of about 170° to 180° C. On distillation off of excess beta-pinene, for example, by maintenance of the reaction temperature and reduction in pressure, a soft resin will be obtained. In proceeding with the use of beta-pinene superatmospheric pressure may be used, as may also a catalyst.

As further illustrative instead of alpha- or beta-pinene, corresponding terpene cuts relatively rich in alpha- or beta-pinene may be used.

In place of para-toluene sulfonic acid as a catalyst, other acidic catalysts such as benzene sulfuric acid, dilute sulfuric acid, hydrochloric acid, etc. may be used. The catalyst, if one is employed, may be used in amount varying from about 0.1% to about 10% of the amount of pinene used.

In proceeding in accordance with the method embodying this invention, it will be understood that maleic acid may be used in substitution for maleic anhydride, though generally the use of maleic anhydride will be preferred. Likewise, the method may be carried out within wide ranges of temperature, it being only necessary to use a temperature at which the reaction will proceed without injurious modification of the reactants or product, and it being noted that the use of any particular reacting temperature will only largely effect the rate of the reaction and the amount of the yield. Further, the method may be carried out with the use of atmospheric or superatmospheric pressure within a wide range, the effect of increased temperature and of the use of superatmospheric pressure being largely upon the rate at which the reaction proceeds.

It will be noted that on completion of the reaction the product will be readily recovered by distillation off of the excess reagents and impurities such as may be present.

The product, as has been indicated, will, generally speaking, comprise a soft, amorphous, acidic resinous material of light color, the particular characteristics of which in any particular case will depend upon the particular pinene used for its production and to a degree upon the particular conditions under which the reaction is carried out. The product will have an acid number of about 275 (fading endpoint) and a saponification number, in pyridine, of about 450–500. Its melting point as determined by the thermometer drop method will range from about 50° to about 65° C.

The product, as has been indicated, will be variously usable in the commercial arts and in particular in coating compositions, thermoplastics, and the like, etc.

The product may be used as such or may be reacted with monohydric alcohols to form esters, which will be found valuable for use variously in the commercial arts, as, for example, coating compositions, and may be reacted with polyhydric alcohols with or without modifying agents, such as polybasic acids, fatty acids, vegetable oils, resins, etc., for the production of products valuable for use in the commercial arts, as, for example, in coating compositions, plastics, etc.

The pinene-maleic anhydride addition product or its esterified products may be hydrogenated, if any unsaturated bonds are present. The product in solution is treated under hydrogen pressures up to about 200 atmospheres at temperatures about 0–100° C. in the presence of a precious metal hydrogenation catalyst as activated platinum or palladium. The products may also be hydrogenated by contacting with a base metal hydrogenation catalyst as nickel, cobalt, copper-chromite, etc. under about 5–300 atmospheres hydrogen pressure and heating to temperatures ranging from about 125 to 250° C.

Having now described my invention, what I claim and desire to protect by Letters Patent is:

1. A product of the reaction of a pinene and maleic anhydride.
2. A product of the reaction of alpha-pinene and maleic anhydride.
3. A product of the reaction of beta-pinene and maleic anhydride.
4. A product of the reaction of a terpene cut rich in alpha-pinene and boiling within the range of from about 150° to about 160° C. and maleic anhydride.
5. A product of the reaction of a terpene cut rich in beta-pinene and boiling within the range of from about 160° to about 170° C. and maleic anhydride.
6. The method of producing a resinous composition which includes reacting maleic anhydride and a pinene at a reaction temperature.
7. The method of producing a resinous composition which includes reacting maleic anhydride and alpha-pinene at a reaction temperature.
8. The method of producing a resinous composition which includes reacting maleic anhydride and beta-pinene at a reaction temperature.
9. The method of producing a resinous composition which includes reacting maleic anhydride and a terpene cut rich in alpha-pinene and boiling within the range of from about 150° to about 160° C. at a reaction temperature.
10. The method of producing a resinous composition which includes reacting maleic anhydride and a terpene cut rich in beta-pinene and boiling within the range of from about 160° to about 170° C. at a reaction temperature.
11. The method of producing a resinous composition which includes reacting maleic anhydride and a terpene cut containing a pinene and boiling within the range of from about 150° C. to about 170° C., at a reaction temperature.
12. The method of producing a resinous composition which includes reacting maleic anhydride and a pinene at a reaction temperature and in the presence of an acidic condensation catalyst.
13. The method of producing a resinous composition which includes reacting maleic anhydride and a pinene under superatmospheric pressure at a reaction temperature.
14. A product of the reaction of a terpene cut rich in pinene and boiling within the range of from about 150 to about 170° C. and maleic anhydride.
15. The method of producing a resinous composition which includes reacting maleic anhydride and alpha-pinene at a reaction temperature and in the presence of an acidic condensation catalyst.
16. The method of producing a resinous composition which includes reacting maleic anhydride and a terpene cut rich in alpha-pinene and boiling within the range of from about 150° C. to about 160° C., at a reaction temperature and under superatmospheric pressure.
17. The method of producing a resinous composition which includes reacting maleic anhydride and a terpene cut rich in beta-pinene and boiling within the range of from about 160° C. to about 170° C., at a reaction temperature and under superatmospheric pressure.
18. The method of producing a resinous composition which includes reacting maleic anhydride and an excess of a pinene at a reaction temperature.
19. The method of producing a resinous composition which includes reacting maleic anhydride and a pinene at a temperature within the range of from about 150° C. to about 250° C.

IRVIN W. HUMPHREY.